US009896982B1

United States Patent
Zhang et al.

(10) Patent No.: US 9,896,982 B1
(45) Date of Patent: Feb. 20, 2018

(54) SYSTEM FOR CONTROLLING THE TOTAL EMISSIONS PRODUCED BY A MULTI-ENGINE POWER SYSTEM

(71) Applicant: Caterpillar Inc., Peoria, IL (US)

(72) Inventors: Yanchai Zhang, Dunlap, IL (US); Michael A. Snopko, Washington, IL (US); Perry D. Converse, Lafayette, IN (US); Vijay Janardhan, Dunlap, IL (US); Insu Chang, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/243,158

(22) Filed: Aug. 22, 2016

(51) Int. Cl.
*F01N 3/20* (2006.01)
*F02D 25/04* (2006.01)
*H02P 9/00* (2006.01)

(52) U.S. Cl.
CPC ............ *F01N 3/208* (2013.01); *F02D 25/04* (2013.01); *H02P 9/008* (2013.01); *F01N 2610/02* (2013.01); *F01N 2900/1806* (2013.01); *F02D 2250/36* (2013.01)

(58) Field of Classification Search
CPC .............. F01N 3/208; F01N 2610/02; F01N 2900/1806; F01N 3/035; F01N 3/0814; F01N 3/0842; F01N 3/2066; F01N 11/002; F01N 2560/026; F02D 2250/36; F02D 13/0242; Y02T 10/24; Y02T 10/26; Y02T 10/47
See application file for complete search history.

(56) References Cited

U.S. PATENT DOCUMENTS

| | | | |
|---|---|---|---|
| 6,882,929 B2 | 4/2005 | Liang et al. | |
| 7,472,545 B2 | 1/2009 | Hemingway et al. | |
| 8,161,731 B2 | 4/2012 | Driscoll et al. | |
| 9,109,488 B2* | 8/2015 | Hall | F01N 3/18 |
| 2004/0074229 A1* | 4/2004 | Upadhyay | B01D 53/9431 60/286 |
| 2005/0282285 A1 | 12/2005 | Radhamohan et al. | |
| 2008/0072575 A1* | 3/2008 | Yan | F01N 3/0231 60/284 |
| 2009/0133383 A1 | 5/2009 | Shost | |
| 2010/0094490 A1* | 4/2010 | Alston | B63H 21/17 701/21 |
| 2010/0126481 A1 | 5/2010 | Willi et al. | |
| 2011/0005199 A1* | 1/2011 | Kammer | F01N 3/0814 60/274 |
| 2011/0192143 A1* | 8/2011 | Andersson | F01N 3/021 60/274 |

(Continued)

*Primary Examiner* — Crystal J Barnes-Bullock
(74) *Attorney, Agent, or Firm* — James S. Bennin

(57) ABSTRACT

A power system for powering a load is provided. The power system includes a plurality of power sources with each power source including an engine. A SCR system is associated with the engine of at least one of the plurality of power sources. A controller is in communication with the plurality of power sources. The controller is configured to receive engine operation information, emission output information associated with each engine and conversion efficiency information associated with the SCR system and selectively apportion the power demand presented by the load between each of the plurality of power sources based on minimizing total engine emissions across the plurality of power sources and using the engine operation information, the emission output information and the conversion efficiency information.

20 Claims, 3 Drawing Sheets

(56) References Cited

U.S. PATENT DOCUMENTS

| | | | |
|---|---|---|---|
| 2013/0067890 A1* | 3/2013 | Michalek | F01N 3/208 60/274 |
| 2014/0150409 A1* | 6/2014 | George | F01N 9/00 60/274 |
| 2015/0168260 A1* | 6/2015 | Adams | F01N 3/106 60/274 |

* cited by examiner

SYSTEM FOR CONTROLLING THE TOTAL EMISSIONS PRODUCED BY A MULTI-ENGINE POWER SYSTEM

TECHNICAL FIELD

This disclosure relates generally to a plurality of engines arranged together to generate power, more particularly, to a system and method for controlling the total emissions produced across the plurality of engines.

BACKGROUND

Certain applications can involve the use of multiple internal combustion engines that are harnessed together to drive one or more loads. One such application can be the generation of electrical power for an electrical load using multiple generator sets (known as "gensets") with each genset including in combination an engine and an electrical generator or alternator. Marine vessels are another application that can include multiple engines harnessed together to drive one or more primary loads (e.g., propellers) and various auxiliary loads (e.g., HVAC, lighting, pumps, etc.). The engines can be mechanically connected to the loads or electrically connected to the loads by way of generators. In some applications, the loads of a vessel can be driven both mechanically and electrically in a hybrid arrangement.

In typical multi-engine applications, all engines are simultaneously operated to produce about the same amount of power. For example, a particular marine vessel may have four identical engines each capable of producing about 5,000 kW. And during operation, all of the engines may be operated at the same level (e.g., at about 20% capacity) to evenly distribute the loads (e.g., to evenly distribute a 4,000 kW load). If different engines have different output capacities than others in the group of engines, the engines may be operated synchronously based in proportion on their individual rated capacities for power output in a manner sometimes referred to a symmetric load sharing or symmetric loading. In symmetric loading, each engine is operated to output power according to its relative capacity in proportion to the total capacity of the combined engines. Hence, the engines are all being operated at the same percentage of their individual, relative capacity, and theoretically should be subjected to the same level of stress and wear, even though some engines may be producing a larger absolute output than other engines.

While these load sharing strategies help ensure that each genset of the plurality is operated within its capacity and capabilities, they do not take into account other considerations associated with the operation of the engines, such as the total emissions produced by the engines. Internal combustion engines exhaust a complex mixture of air pollutants. These air pollutants are generally composed of particulates and gaseous compounds including nitrogen oxides (commonly referred to as $NO_x$) among others. Due to increased awareness of the environment, exhaust emission standards have become more stringent, and the amounts of particulates and $NO_x$ emitted into the atmosphere by an engine may be regulated depending on the type of the engine, size of the engine, class of the engine, and the like as well as the location in which the engine is operating. For example, the engines operating on a marine vessel may be subject to different regulations depending on whether the vessel is in port or at sea. Using a strict symmetric load sharing strategy for a multi-engine application may result in higher than desired total emissions across the plurality of engines.

Moreover, in order to comply with the regulation of particulates and $NO_x$, some engine manufacturers have implemented a strategy called selective catalytic reduction (SCR), which is a process where a reagent known as diesel exhaust fluid (DEF), most commonly urea, or a water/urea solution, is selectively injected into the exhaust gas stream of an engine and absorbed onto a downstream substrate in order to reduce the amount of $NO_x$ in the exhaust gases. However, the efficiency and cost of the operation of a SCR system can vary depending upon the load condition of the engine. A strict load sharing strategy for multi-engine applications does not take into account SCR system operating conditions.

U.S. Publication No. 2005/0282285 ("the '285 publication") discloses a strategy for controlling $NO_x$ emissions in an SCR system associated with an internal combustion engine. However, the '285 publication does not address the total emissions produced by a plurality of engines harnessed together to drive a load.

SUMMARY

In one aspect, the disclosure describes a power system for powering a load. The load presents a power demand. The power system includes a plurality of power sources with each power source including an engine. A SCR system is associated with the engine of at least one of the plurality of power sources. A controller is in communication with the plurality of power sources. The controller is configured to receive engine operation information, emission output information associated with each engine and conversion efficiency information associated with the SCR system and selectively apportion the power demand between each of the plurality of power sources based on minimizing total engine emissions across the plurality of power sources and using the engine operation information, the emission output information and the conversion efficiency information.

In another aspect, the disclosure describes a method for controlling a power system. The method includes operating a plurality of engines to power a load with at least one of the engines having an SCR system. A signal indicative of a power demand for the load is received. Engine operation information relating to the plurality of engines is received. Emission output information relating to each engine is received. Conversion efficiency information relating to the SCR system is received. The power demand is selectively apportioned between each of the power sources based on minimizing total engine emissions and using the engine operation information, the emission output information and the conversion efficiency information.

In yet another aspect, the disclosure describes a control system for a power system having a plurality of engines that together drive a load. The control system includes a load manager controller configured to determine a power demand for the load and a power system controller. The power system controller is in communication with the plurality of power sources. The power system controller is configured to receive the power demand, engine operation information, emission output information associated with each engine and conversion efficiency information associated with the SCR system and selectively apportion the power demand between each of the plurality of power sources based on minimizing total engine emissions across the plurality of power sources and using the engine operation information, the emission output information and the conversion efficiency information.

DETAILED DESCRIPTION

Figure 1:
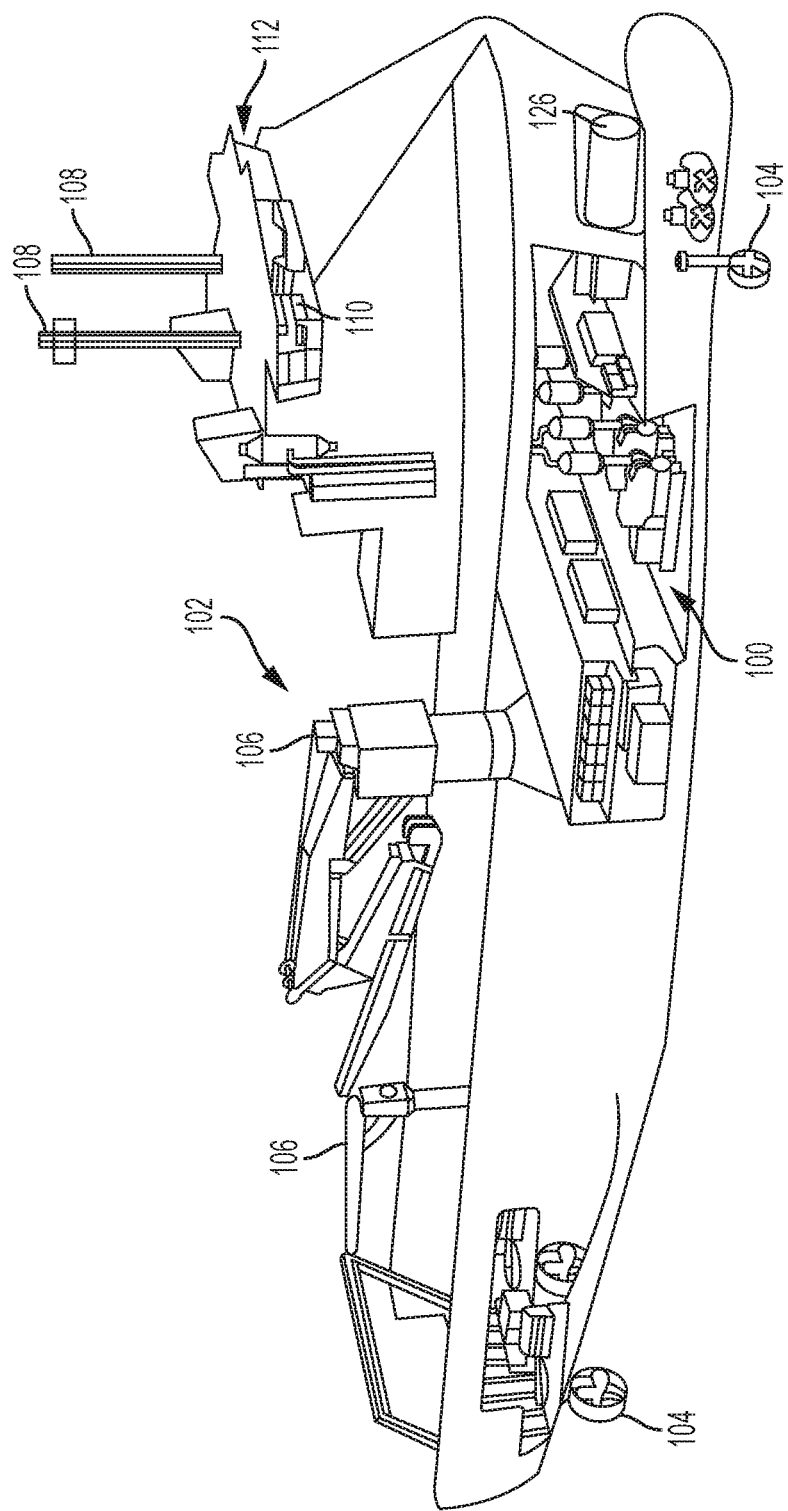
FIG. 1 is a schematic illustration of an exemplary marine vessel with various exemplary loads that can be powered by a power system according to the present disclosure.

This disclosure relates to a power system including a plurality of internal combustion engines and the control strategies and electronic or digital controllers for regulating operation of the engines. Now referring to the drawings, wherein like reference numbers refer to like elements, there is illustrated in FIG. 1 a power system 100 that may be arranged to generate power for one or more consumers of power, referred to herein as loads 101 (schematically shown in FIG. 2), of, in the illustrated embodiment, a marine vessel 102 like a freighter or cargo ship. For example, the electrical power system 100 may generate electrical power for the propulsion units 104 of the marine vessel, which may be a plurality of electrically driven azimuth thrusters. The loads 101 driven by the power system 100 may include any device or devices that consume mechanical and/or electrical power, including, but not limited to, motorized cranes 106 for lifting and moving freight, communication equipment 108 for communicating with shore and other marine vessels, navigation controls 110 that may be disposed in the bridge 112 of the marine vessel 102 for directing movement and operation of the marine vessel, electric lights, HVAC systems, water pumps, and other auxiliary loads that are normally found on a conventional marine vessel.

Other marine applications for the power system 100, in addition to the illustrated freighter, include military vessels, passenger liners, tankers, and the like. In addition to being utilized for marine vessels 102, the power system 100 described herein may be utilized for oil or gas procuring applications, temporary military bases, and other electrical applications where electrical power from a utility-supplied power grid is not readily available or may be interrupted.

Figure 2:
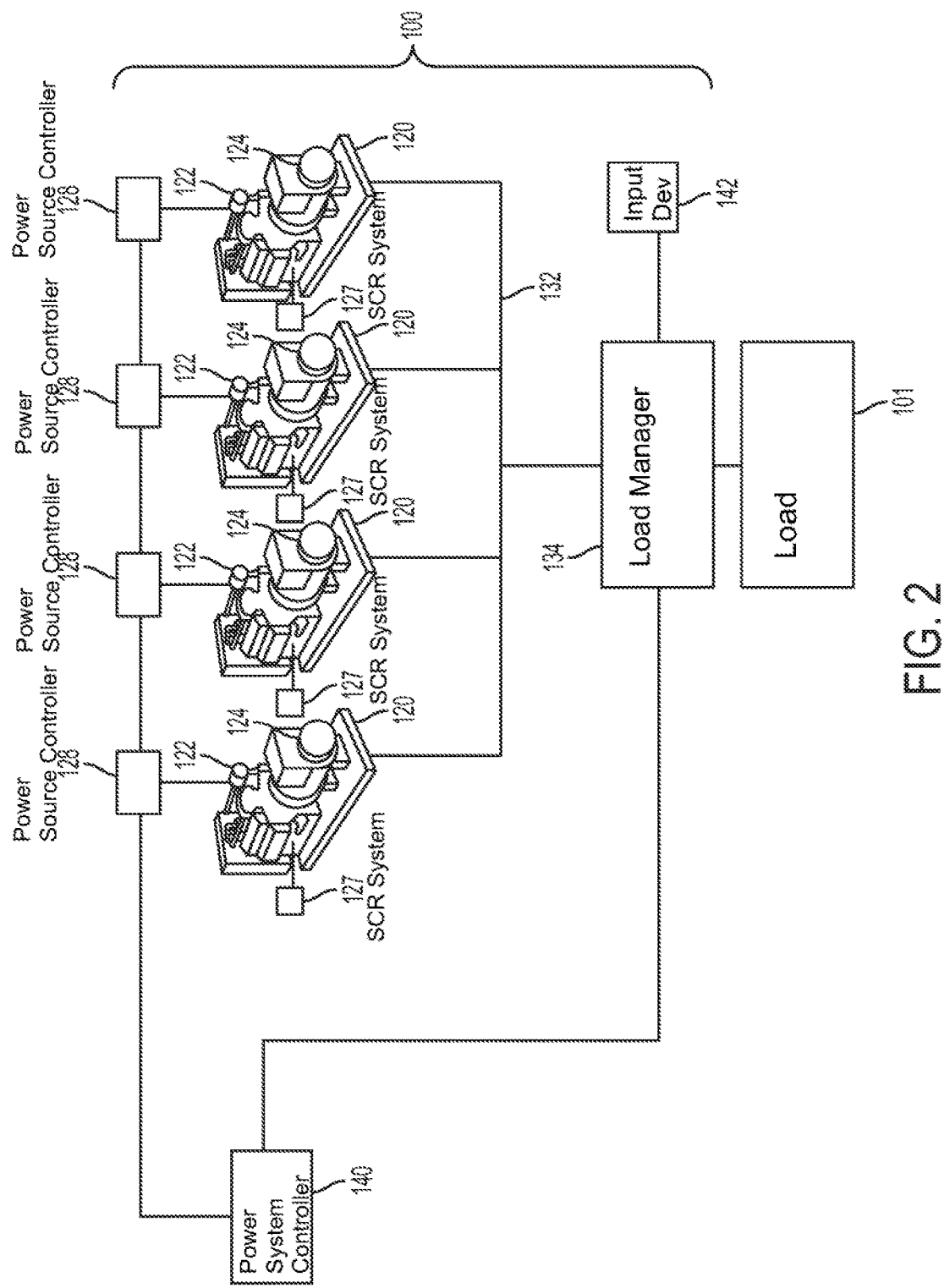
FIG. 2 is a schematic illustration of an illustrative multi-engine power system according to the present disclosure.

As can be seen in FIG. 2, the power system 100 may include, among other things, a plurality of power sources 120 that can operate in combination with each other to power one or more loads. The power sources 120 may embody any number and type of combustion engines 122, such as diesel compression ignition engines, some or all of which that are connected to corresponding alternators or generators 124 to form gensets. The mechanical outputs of the combustion engines 122 may be routed directly to loads 101 (e.g., mechanically routed to the propulsion units) and/or indirectly by way of the generators 124 (e.g., electrically routed to motors of the propellers and to the other auxiliary loads). To provide fuel for the engine 122 to combust, the electrical power system 100 may be operably associated with one or more fuel tanks 126 or reservoirs. In the case of gensets, the engines 122 can combust hydrocarbon fuel and air to produce a mechanical force or motive power that rotates a magnetic field in the electrical generator 124 that is converted to electrical power. While the electrical capacity of the gensets described herein may be rated at any suitable quantity, an exemplary genset may produce several kilowatts and the combination of the gensets may together produce several hundred kilowatts.

In the illustrated embodiment, the power system 100 includes four different power sources 120, in this case four different gensets, but in other embodiments any suitable number of power sources 120 may be provided. It is contemplated that a particular vessel 102 could include identical gensets, all different gensets, or any other configuration of gensets, as desired. Similarly, the engines 122 associated with each of the gensets may be identical, all different or any other configuration of engines as desired. For example, the power system 100 may include two larger medium-speed gensets and two smaller high-speed gensets. The larger medium-speed generator sets may be capable of greater power output at higher fuel efficiency (i.e., lower fuel consumption) and/or lower emissions. The smaller high-speed generator sets, however, may be capable of faster transient response and high-efficiency low-load operation. By including a mix of different types and/or sizes of generator sets, benefits associated with the different sets may be realized. It is also contemplated that power sources other than engines and generators may be used to power loads 101 associated with the vessel 102, for example batteries or other power storage devices.

To reduce exhaust emissions, one or more of the engines 122 may be equipped with a SCR system 127 to reduce the amount of nitrogen oxides in the exhaust gases produced by operation of the respective engine 122. In the illustrated embodiment, the engine 122 associated with each of the four power sources 120 is equipped with a SCR system 127 as shown schematically in FIG. 2. However, it is contemplated that one or more of the engines 122 may be equipped with an SCR system 127 while others are not or that none of the engines 122 are equipped with an SCR system 127. The SCR system 127, if provided, may be disposed in the exhaust system of the respective engine 122 and be configured to selectively inject DEF, commonly urea or urea/water solution, into the exhaust gas stream of the engine 122. The DEF may then be absorbed on a downstream substrate in order to reduce the amount of $NO_X$ in the engine exhaust gases. Those skilled in the art will appreciate that the present disclosure is not limited to SCR systems 127 having any particular configuration.

To govern operation of the engine 122 and the electrical generators 124, each power source 120 may include an electronic power source controller 128 that may be a computing device capable of performing typical computing and digital processing functions. To combine the power being generated, the plurality of power sources 120, which in the illustrated embodiment are configured as gensets, may be electrically connected to a common bus 132 or busbar in a parallel arrangement as shown in FIG. 2. In a parallel arrangement, the total current generated by the power system 100 is the sum of the individual currents generated by each of the plurality of power sources 120 or gensets while the potential or voltage is generally the same across each of the gensets. The common bus 132 can be electrically connected through a network or circuit with the electrical equipment of the marine vessel 102, which may make up part of the load 101 of the vessel. The plurality of power sources 120 therefore may each, as desired, meet a portion of the load 101 of the vessel. While the present disclosure describes power sources 120 configured as gensets that produce an electric current to meet an electric load, as noted previously the mechanical outputs of the engines 122 may be routed directly to the loads 101 without an intervening generator.

As shown schematically in FIG. 2, the power system 100 may further include a load manager 134 and a power system controller 140. The load manage 134 may determine a power demand for the power sources 120 based on, among other things, input received from various input devices, referred to generally with reference number 142 in FIG. 2, such as provided on the bridge 112 of the vessel 102 (or another location onboard and/or offboard vessel 102) and on an actual output or performance of the loads 101 driven by the power system 100. As described in greater detail below, the power system controller 140 may selectively adjust operation of the power sources 120 or the engines 122 in different ways to meet the power demand from the load manager 134.

The load manager 134 may be configured to compare an actual output of the power system 100 to a desired output (e.g., desired travel speed, desired propeller speed, desired vessel location, etc.), and create a power demand based on the difference. In the disclosed embodiment, the load manager 134 may be a generator controller configured to compare an actual bus voltage to a desired voltage and responsively generate a command for electrical power supply based on the difference. For example, the propulsion units 104 of the vessel 102 may be electrically powered from a common bus and directly controlled from the bridge 112. The operator of the vessel 102 may move a throttle lever (not shown) to command the vessel 102 (and/or a particular propulsion unit) to move at a particular desired speed. As signals from the bridge 112 cause the propellers to turn on, turn faster, slow down, or turn off, the motors associated with the propulsion units 104 may consume more or less electricity from the common power bus 132. This change in power consumption may cause a corresponding voltage fluctuation in the bus 132, and load manager 134 may monitor the voltage fluctuation and responsively generate the command for more or less electrical power to be supplied by the power sources 120 to the bus 132.

In another example, the load manager 134 may be a stand-alone component and configured to compare an actual vessel 102 travel speed or actual propulsion unit 104 speed to a desired travel or desired propulsion unit 104 speed and generate a command for a change in power (mechanical and/or electrical) based on the difference. In yet another example, the load manager 134 may compare an actual vessel 102 position and/or orientation to a desired position or orientation, and generate a command for a change in power based on the difference. Other comparisons may also be instituted by the load manager 134, and the load manager 134 may take any conventional configuration known in the art for creating the power demand. Signals generated by the load manager 134 indicative of the power demand may be directed to the power system controller 140 for further processing.

The power system controller 140, which may be referred to as multi-engine optimizer (MEO) controller, may include commonly known components that cooperate to apportion the power demand from the load manager 134 among the different power sources 120. The power system controller 140 may communicate with each of the individual power source controllers 128 that direct operation of the individual power sources 120. The power system controller 140 may include, among other things, a single or multiple microprocessors, digital signal processors (DSPs), etc. that include means for controlling an operation of the power system 100 and be located onboard and/or offboard vessel 102. The power system controller 140 may include a processor, an application specific integrated circuit (ASIC), or other appropriate circuitry for performing logic and digital functions, and may have associated memory or similar data storage capabilities. The power system controller 140 may be a discrete, individual unit, or their functions may be distributed over a plurality of distinct components. To the extent multiple electronic controllers are used, the electronic controllers may operate and communicate with each other using digital signals, analog signals, or through any other suitable means. The electronic controllers may communicate with each other through wired connections or may communicate wirelessly through radio frequency or wi-fi mediums.

Numerous commercially available microprocessors can be configured to perform the functions of the power system controller 140. It should be appreciated that the power system controller 140 could readily embody a microprocessor separate from that controlling other vessel- or engine-related functions, or that the power system controller 140 could be integral with a vessel microprocessor and be capable of controlling numerous functions and modes of operation. As a separate microprocessor, the power system controller 140 may communicate with the general vessel microprocessor(s) and/or engine controllers via datalinks or other methods. Various other known circuits may be associated with the power system controller 140, including power supply circuitry, signal-conditioning circuitry, actuator driver circuitry (i.e., circuitry powering solenoids, motors, or piezo actuators), and communication circuitry.

As described above, one method for apportioning the power demand communicated by the load manager 134 is symmetric load sharing in which each power source 120 or engine 122 outputs a proportional share of the total power demand. While symmetrical load sharing accounts evenly for the different capacities of the plurality of power sources 120 or engines 122 of the power system 100, it may not account for differences between the engines 122 of the individual gensets. For example, each engine 122 may produce exhaust emissions in accordance with an associated exhaust emission curve that determines the emissions produced by the engine 122 in relation to the particular power being output from the engine 122. This exhaust emission curve may determine or indicate where the individual engine 122 may operate most efficiently in terms of reducing or minimizing engine exhaust emissions. Where the engine 122 operates most efficiently in terms of minimizing exhaust emissions may not correspond to the power output being requested of a power source 120 by the symmetrical load sharing strategy.

To allow for the engines 122 to be operated in a manner that minimizes the total exhaust emissions produced by all the operating engines 122 of the power system 100, the power system controller 140 may be configured to perform an optimization process that determines an optimized apportionment of the power demand to the individual operating engines 122 of the power system 100 based upon minimizing total engine emissions. To this end, the power system controller 140 may apportion the power demand from load manager 134 based on emission output information associated with each power source 120 or engine 122. Specifically, the power system controller 140 may retrieve and/or receive from each engine 122 (e.g., from the power source controller 128 associated with each engine 122 and/or with each generator 124) an emission output map. It is contemplated that the maps may be different for each engine 122 and/or for each different type of engine 122, as needed. The power system controller 140 may then compare different apportionments of the power demand from the load manager 134 with the emission output map to determine the particular configuration of apportionments that provides the overall lowest exhaust emission output possible from all of the engines 122. In some embodiments or circumstances, this may result in an equal apportionment of the power demand between the different power sources 120. In most instances, however, the apportionment may be unequal. In fact, in some instances, one or more of the power sources 120 may be operated to satisfy a majority of the power demand and one or more others of the other power sources 120 may supply little of the demand or even be turned off.

Whether the power system controller 140 apportions the power demand based on total engine emissions, may be determined by an operator of the vessel or power system or it may be automatically determined based signals relating to other vessel-related or power system-related functions. Accordingly, the power system controller 140 may be configured to receive emission mode selection information which may communicate to the power system controller 140 whether to enable the engine emission control mode. The emission mode selection information may be input through an input device, for example in the bridge 112, by an operator of the vessel 102 or the power system 100. Alternatively or additionally, the emission mode selection information may also include information that may signal an automatic enablement of the engine emission based apportionment of the power demand such as, for example, information relating to the location of the vessel 102 (e.g., in port or at sea) and/or information relating to an operating mode of the engines 122. Additionally, the emission mode selection information may include information regarding whether the power system 100 is presently in a transient condition (i.e., the speed or load is changing dynamically) in which enablement of the emission mode may not be appropriate or in a steady state condition in which the emission mode may be enabled.

In determining the optimized apportionment of the power demand, the optimization process performed by the power system controller 140 may also take into account one or more additional considerations that may constrain the minimization of exhaust emissions. For example, the power system controller 140 may take into account engine operation information. The engine operation information considered by the power system controller 140 may include information relating to any priorities assigned to the power sources 120 or engines 122. In such a case, the power system controller 140 may be configured to apportion the power demand to the higher priority power sources 120 or engines 122 first. One example of an engine priority situation is where multiple engines are mechanically linked to each other such that they must be run together. The power system controller 140 may also take into account other engine operation information such as which engines 122 may be offline and the current operating status of the engine 122. The engine operating information may also include a predefined, desired operating range for one or more of the engines 122. For example, the desired operating range for each of the various engines 122 in the power system 100 may be different. The engine operation information may also include a desired power reserve. Specifically, the operator of the vessel 102 or power system 100 may desire a particular amount of power be left in reserve from particular power sources 120, and this power reserve may limit the way in which the power system controller 140 can apportion the power demand. The engine operation information may also include information regarding the mode in which the power system 100 is operating such as a dynamic positioning mode or a cruise control mode.

After all constraints that may be attributable to engine operation information are applied, the power system controller 140 may then determine the optimized apportionment of the power request to each operating engine 122 that minimizes the total engine exhaust emissions output from the power system 100. In some embodiments, this determination may involve the use of a particle swarm optimization method. In considering the engine operation information as well as the exhaust emission information, the power system controller 140 may treat identically configured engines 122 separately or apportion an equal share of the power demand to the identical engines 122.

As noted above, and as shown in FIG. 2, one or more of the engines 122 may be equipped with an SCR system 127. To account for the one or more SCR systems 127, the optimization process performed by the power system controller 140 may include evaluating information relating to operation of the SCR systems 127 in determining the optimized apportionment of the power demand based on the total engine emissions. For example, the power system controller 140 may be configured to retrieve and/or receive (e.g., from the power source controller 128 associated with each SCR-equipped engine) information concerning the efficiency of each SCR system 127 associated with one of the engines in the power system at converting or reducing nitrogen oxides present in the exhaust of the respective engine 122. More specifically, each engine 122 equipped with an SCR system 127 may have an associated conversion efficiency map that details the conversion rate of the nitrogen oxides in the engine exhaust emissions at different operating conditions of the engine 122 and the SCR system 127, for example, at different SCR temperatures and different DEF injection rates. The SCR conversion efficiency maps may be different for each SCR-equipped engine 122 in the power system 100. Upon receiving and/or retrieving the SCR conversion efficiency map, the power system controller 140 may use the SCR conversion efficiency map in determining the $NO_X$ emissions produced by the engines 122 equipped with SCR systems 127 and thereby in determining the optimized apportionment of the power demand that minimizes total engine emissions.

Other considerations that may be taken into account by the power system controller 140 in determining the optimized apportionment of the power demand to the operating engines that minimizes the total engine emissions are the costs associated with operating the engines 122 and the associated SCR systems 127 if a balance between operating costs and total engine emissions is desired. For example, operation of the engine 122 consumes fuel and operation of the SCR system 127 consumes DEF. The consumption of fuel and DEF has an associated monetary cost at different engine 122 and SCR system 127 operating conditions and the power system controller 140 can be configured to take this cost into account in determining the optimized apportionment of the power demand. In such a case, the power system controller 140 may direct each engine 122 to an optimized load condition based minimized total engine emissions at a reasonable cost. In balancing total emissions and costs, the power system controller 140 may apply a weight factor to each consideration that reflects the relative importance of emissions versus costs. These weight factors may be predetermined or based on information input by an operator of the vessel 102 or power system 100.

The optimized power distribution to the operating engines 122 for different power demands may be determined offline using the optimization process and stored as a map which is then used in real time by the power system controller 140 to direct apportionment of the power demand to the power sources. The optimization process can also be implemented by the power system controller 140 online to generate the optimized apportionment of the power demand at each time step.

In some applications, it may be possible over time for performance of a particular engine 122 or SCR system 127 to drift away from the control maps stored within the corresponding power source controllers 128 or the power system controller 140. For example, it may be possible for an older engine 122 to have decreased performance due to wear, or for system inputs (e.g., fuel quality, wind current, ocean current, ambient air temperature, etc.) to deviate from assumed or expected values. In these situations, the power system controller 140 may be capable of modifying the existing control maps based on monitored engine 122 and/or SCR system 127 performance. Specifically, the power system controller 140 may be capable of monitoring, processing, and recording engine 122 and SCR system 127 performance for future use in power demand apportioning.

The power system controller 140 may rely on different sensors when monitoring engine 122 and SCR system 127 performance and/or modifying the existing control maps. These sensors may include, for example, one or more fuel flow meters associated with each engine 122, speed sensors, torque sensors, emission sensors (e.g., NOx sensors), temperature sensors, pressure sensors, voltage sensors, current sensors, fuel level sensors, DEF level sensors, DEF flow meters, and other performance sensors. The power system controller 140 may also be capable of computing different aspects of engine 122 and/or SCR system 127 performance based on measured parameters. For example, the power system controller 140 may be capable of computing engine torque, emissions, and/or wear based on measured rpm, fuel flow rates, temperatures, and/or pressures. The power system controller 140 may then update and/or create the required control maps based directly on the measured parameters and/or based on the calculated parameters.

INDUSTRIAL APPLICABILITY

The disclosed power system 100 and method for controlling a power system 100 may be applicable to any application that may require power provided by multiple engines. For example, the disclosed power system 100 and control method may be applicable to a marine and/or petroleum drilling vessel application, where the power sources cooperate to propel the vessel and to power auxiliary loads under varying conditions. The disclosed power system and method may allow for an optimized apportionment of the power demand to the operating engines that minimizes total engine emissions at, in some embodiments, a reasonable cost.

Figure 3:
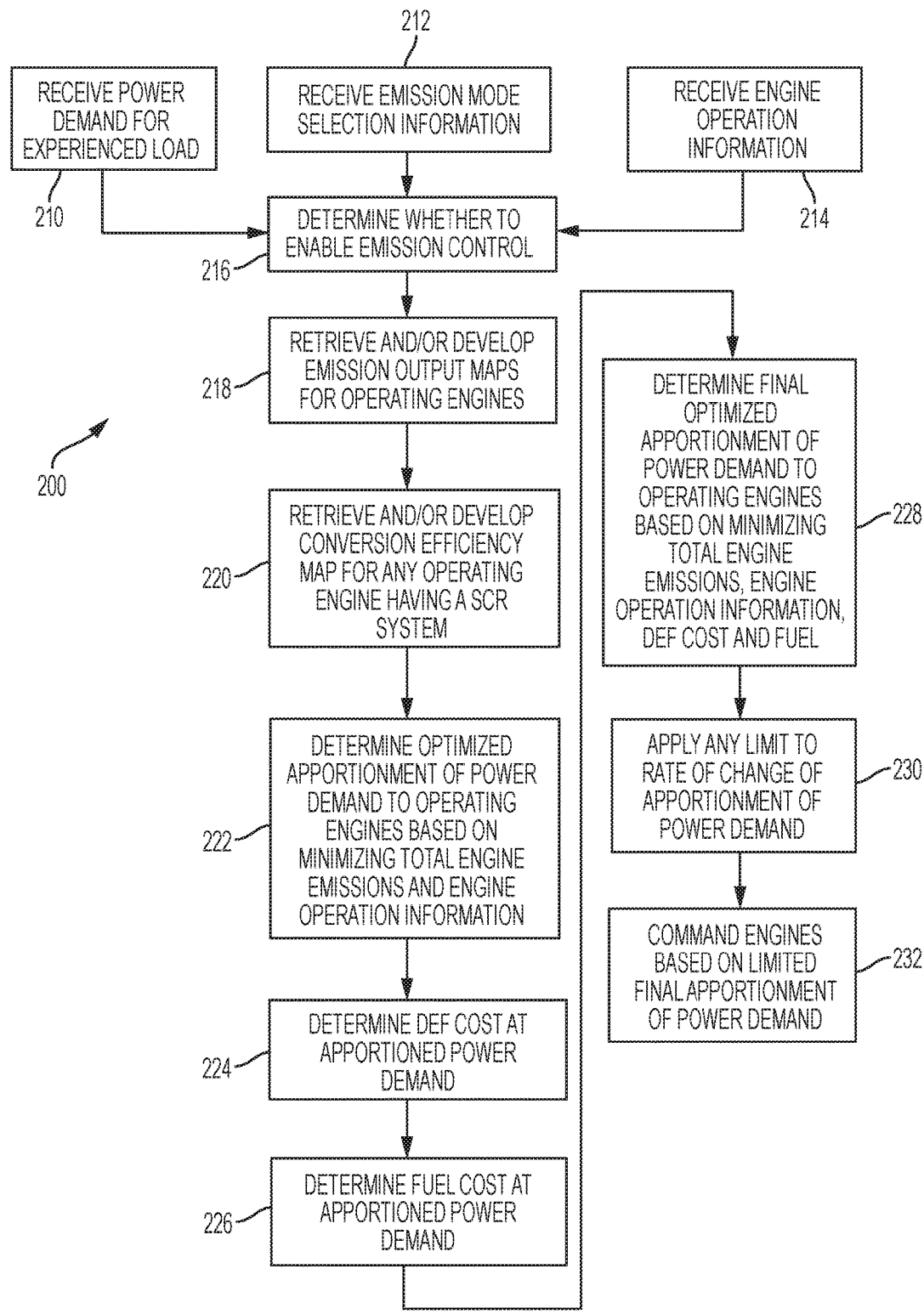
FIG. 3 is a flowchart embodying an exemplary control system for the multi-engine power system of FIG. 2

Referring to FIG. 3, there is provided a flow chart of a multi-engine control method 200 that may be implemented by the power system controller 140. The steps of the control method described herein may be embodied as machine readable and executable software instructions, software code, or executable computer programs. The software instructions may be further embodied in one or more routines, subroutines, or modules and may utilize various auxiliary libraries and input/output functions to communicate with other equipment. The control strategy may also be associated with an operator interface through which the strategy may interact with an operator of the marine vessel 102 or power system 100.

In step 210, a power demand for the experienced load is received. This power demand may be received from the from load manager 134. Information regarding emission mode selection is received in step 212. This information relates to whether to implement the emission control mode. As noted above, this information may be communicated by an operator of the vessel 102 or power system 100 through an input device and/or be communicated by other control systems associated with the vessel and/or power system. Engine operation information is received in step 214. This may include, for example, engine priorities, desired power reserve, engine operating modes, engine online/offline status and/or desired engine operating range In step 216, the power system controller 140 may determine whether to enable or implement the emission control mode using, for example, the information from steps 210, 212 and 214. Once the emission control mode has been enabled, the power system controller 140 may obtain (i.e., retrieve and/or develop) the associated emission output maps for the operating engines 122 in step 218. If any engine 122 in the power system 100 has an operating SCR system 127, the power system controller 140 may retrieve and/or develop the associated SCR conversion efficiency map for that engine 122 and SCR system 127 in step 220. As discussed above, the power system controller 140 may retrieve the emission and conversion efficiency maps from the power source controllers 128 and when these maps are no longer accurate, the power system controller 140 may develop and update the maps based on monitored performance. If none of the operating engines 122 include an SCR system 127, then step 220 may not be performed.

In step 222, the power system controller 140 may determine the optimized apportionment of the power demand to the operating engines 122 based on minimizing total engine emissions across the power system 100 as well as the engine operation information from step 214. In evaluating the total engine emissions, the power system controller 140 may use the emission output maps for each engine from step 218 and the conversion efficiency maps associated with each SCR system from step 220. As noted previously, this determination may include a particle swarm optimization methodology. Moreover, it should be appreciated that the terms "optimized," "optimal," and the like are used herein as relative terms and should not be construed as an absolute or as addressing considerations other than such considerations described herein.

If operating costs are to be considered in apportioning the power demand, the DEF cost at the apportioned power demand and the fuel cost at the apportioned power demand may be determined in steps 224 and 226. In step 228, These costs are then used along with the emission output maps from step 218 and the SCR conversion efficiency maps from step 220 to determine a final optimized apportionment of the power demand to the operating engines. The apportionment of step 228 may be based on minimizing total engine emissions, the engine operating information (from step 214), the DEF cost (from step 224) and the fuel cost (step 226). In determining the optimized apportionment in step 228, different weight factors may be applied to the total engine emissions and the total costs to reflect the relative importance of these considerations. If costs are not to be considered, steps 224, 226 and 228 may be not be performed. Moreover, it is possible that the power system controller 140 may consider only one of the fluids (DEF or fuel) in evaluating the costs associated with the apportionment of the power demand.

In step 230, the power system controller 140 may apply a limit to the rate of change of the apportionment of the power demand in order to help smooth changes in the apportionment of the power demand to the various engines 122 and thereby prevent any undesirable, significant fluctuations in the operating condition of any of the engines 122. In step 232, the operating engines 122 are commanded based on the final apportionment of the power demand (from step 228 if cost evaluation is performed, or step 222 if costs are not evaluated) as limited by any rate limit applied in step 230.

This disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A power system for powering a load, the load presenting a power demand, the power system comprising:
    a plurality of power sources with each power source including an engine;
    a selective catalytic reduction (SCR) system associated with the engine of at least one of the plurality of power sources; and
    a controller in communication with the plurality of power sources, the controller being configured to:
        receive engine operation information, emission output information associated with each engine, and conversion efficiency information associated with the SCR system,
            wherein the conversion efficiency information provides information regarding a conversion rate of the nitrogen oxides in the engine exhaust emissions at different operating conditions of the SCR system and the engine of the at least one of the plurality of power sources, and
            wherein the different operating conditions of the SCR system and the engine include different SCR temperatures and different diesel exhaust fluid injection rates,
        determine engine emissions produced by the engine of the of at least one of the plurality of power sources, the engine emissions being determined using the conversion efficiency information, and
        selectively apportion the power demand between each of the plurality of power sources based on minimizing total engine emissions across the plurality of power sources and using the engine operation information, the emission output information and the engine emissions determined for the engine of the of at least one of the plurality of power sources.

2. The power system of claim 1 wherein the controller is configured to receive operating cost information associated with each engine and use the operating cost information in selectively apportioning the power demand between each of the plurality of power sources.

3. The power system of claim 2 wherein the controller is configured to apply different weight factors to the operating cost information and the emission output and conversion efficiency information.

4. The power system of claim 2 wherein the operating cost information includes fuel cost information associated with each engine.

5. The power system of claim 4 wherein the operating cost information includes diesel exhaust fluid (DEF) cost information associated with the SCR system.

6. The power system of claim 1 wherein at least one of the power sources includes a generator driven by the respective engine.

7. The power system of claim 1 wherein the controller is configured to apportion the power demand based further on monitored performances of the plurality of power sources.

8. The power system of claim 1 wherein the engine operation information includes at least one of a desired power reserve, engine online/offline status and a desired operating range for one or more of the plurality of engines.

9. A method for controlling a power system, the method comprising:
    operating a plurality of engines to power a load,
        at least one of the plurality of engines having a selective catalytic reduction (SCR) system;
    receiving a signal indicative of a power demand for the load;
    receiving engine operation information relating to the plurality of engines;
    receiving emission output information relating to each engine;
    receiving conversion efficiency information relating to the SCR system,
        wherein the conversion efficiency information provides information regarding a conversion rate of nitrogen oxides in the engine exhaust emissions at different operating conditions of the SCR system and the at least one of the plurality of engines, and
        wherein the different operating conditions include different SCR temperatures and different diesel exhaust fluid injection rates; and
    selectively apportioning the power demand between each of the power sources based on minimizing total engine emissions and using the engine operation information, the emission output information and the conversion efficiency information.

10. The method of claim 9 further including the step of receiving operating cost information associated with each engine and wherein the operating cost information is used in selectively apportioning the power demand between each of the plurality of power sources.

11. The method of claim 9 wherein the step of selectively apportioning the power demand includes applying different weight factors to the operating cost information and the emission output and conversion efficiency information.

12. The method of claim 10 wherein the operating cost information includes fuel cost information associated with each engine.

13. The method of claim 12 wherein the operating cost information includes diesel exhaust fluid (DEF) cost information associated with the SCR system.

14. The method of claim 9 wherein the engine operation information includes at least one of a desired power reserve, engine online/offline status and a desired operating range for one or more of the plurality of engines.

15. The method of claim 9 wherein the step of apportioning the power demand is based further on monitored performances of the plurality of engines.

16. A control system for a power system having a plurality of engines that together drive a load, the control system comprising:
    a load manager controller configured to determine a power demand for the load; and
    a power system controller in communication with the plurality of power sources, the power system controller being configured to:
        receive the power demand, engine operation information, emission output information associated with each engine and conversion efficiency information associated with a selective catalytic reduction (SCR) system, wherein the conversion efficiency information provides information regarding a conversion rate of nitrogen oxides in the engine exhaust emissions at different operating conditions of the SCR system and the engine, and wherein the different operating conditions include different SCR temperatures and different diesel exhaust fluid injection rates, and selectively apportion the power demand between each of the plurality of power sources based on minimizing total engine emissions across the plurality of power sources and using the engine operation information, the emission output information and the conversion efficiency information.

17. The control system of claim 16 wherein the power system controller is configured to receive operating cost information associated with each engine and use the operating cost information in selectively apportioning the power demand between each of the plurality of power sources.

18. The control system of claim 17 wherein the power system controller is configured to apply different weight factors to the operating cost information and the emission output and conversion efficiency information.

19. The control system of claim 17 wherein the operating cost information includes fuel cost information associated with each engine and diesel exhaust fluid (DEF) cost information associated with the SCR system.

20. The control system of claim 16 wherein the engine operation information includes at least one of a desired power reserve, engine online/offline status and a desired operating range for one or more of the plurality of engines.

* * * * *